United States Patent
Fehring et al.

(10) Patent No.: US 7,416,213 B2
(45) Date of Patent: Aug. 26, 2008

(54) SAFETY DEVICE FOR A VEHICLE

(75) Inventors: Michael Fehring, Neuhausen (DE); Rainer Justen, Altdorf (DE); Paul Ott, Sachsenheim (DE); Axel Querengaesser, Fellbach (DE)

(73) Assignee: Daimler AG, Stuttgart (DE)

( * ) Notice: Subject to any disclaimer, the term of this patent is extended or adjusted under 35 U.S.C. 154(b) by 0 days.

(21) Appl. No.: 10/578,554

(22) PCT Filed: Oct. 23, 2004

(86) PCT No.: PCT/EP2004/012001

§ 371 (c)(1),
(2), (4) Date: Mar. 29, 2007

(87) PCT Pub. No.: WO2005/047068

PCT Pub. Date: May 26, 2005

(65) Prior Publication Data

US 2007/0267849 A1 Nov. 22, 2007

(30) Foreign Application Priority Data

Nov. 6, 2003 (DE) ............... 103 51 752

(51) Int. Cl.
*B60R 21/04* (2006.01)

(52) U.S. Cl. ............... 280/753; 296/1.04; 296/187.03; 296/187.05

(58) Field of Classification Search ......... 280/748, 280/751, 753; 296/1.04, 187.03, 187.05
See application file for complete search history.

(56) References Cited

U.S. PATENT DOCUMENTS

| 4,951,963 A * | 8/1990 | Behr et al. ............... 280/753 |
| 5,695,242 A * | 12/1997 | Brantman et al. ......... 297/216.1 |
| 5,794,975 A * | 8/1998 | Nohr et al. ............... 280/753 |
| 2003/0001372 A1* | 1/2003 | Browne et al. ............ 280/751 |

FOREIGN PATENT DOCUMENTS

| DE | 2 232 726 A1 | 1/1974 |
| DE | 28 56 437 A1 | 7/1980 |
| DE | 100 43 290 C1 | 4/2002 |
| FR | 2 744 408 A1 | 8/1997 |

OTHER PUBLICATIONS

Computer translation from EPO/espace.net DE10043290.*
Computer translation from EPO/espace.net DE2232726.*
Computer translation from EPO/espace.net FR2744408.*
Computer translation from EPO/espace.net DE2856437.*

* cited by examiner

*Primary Examiner*—Eric Culbreth
(74) *Attorney, Agent, or Firm*—Crowell & Moring LLP

(57) ABSTRACT

A safety device for reducing risk of injury to a vehicle occupant in the event of lateral impact accidents, includes at least one cushion element which is arranged on the vehicle, laterally adjacent to an occupant position, and can be moved by an actuating device from a rest position into a deployed position in the direction of the occupant position. The actuating device is driven by a vehicle-mounted drive.

11 Claims, 2 Drawing Sheets

SAFETY DEVICE FOR A VEHICLE

BACKGROUND AND SUMMARY OF THE INVENTION

This application is a National Phase of PCT/EP2004/012001, filed Oct. 23, 2004, and claims the priority of German patent document DE 103 51 752.9, filed Nov. 6, 2003, the disclosure of which is expressly incorporated by reference herein.

The invention relates to a safety method and apparatus for a vehicle, in particular for a motor vehicle, for reducing the risk of injury to a vehicle occupant in the event of lateral impact accidents. At least one cushion element is arranged on the vehicle laterally adjacent to an occupant position and can be moved by an actuating device from a rest position into a deployed position in the direction of the occupant position.

A safety device of such type is disclosed in German patent document DE 28 56 437 C2. The actuating device comprises a lever, which in the event of a lateral crash, moves a cushion element in the direction of an occupant position more quickly than the structure of the passenger compartment. The lever is arranged on the cushion element and moves in the same direction on account of the accidental impact. Although this arrangement improves occupant protection in lateral impact accidents, it does not achieve an optimum degree of protection because, despite the relatively fast deployment of the cushion element, the distance between the cushion element and the occupant is so large that a relative movement between the cushion element and the occupant cannot be eliminated completely.

One object of the present invention, therefore, is to provide a safety device for a vehicle, which minimizes the risk of injury to a vehicle occupant in the event of lateral impact accidents.

This and other objects and advantages are achieved by the safety method and apparatus according to the invention in which the actuating device can be driven by a vehicle-mounted drive, and the cushion element can be moved with the aid of the actuating device from a rest position into a deployed position in the direction of the occupant position by means of the vehicle-mounted drive, without external action (for example by means of an accidental impact) being necessary. That is, the cushion element can be actively moved in the direction of an occupant position in order to reduce the distance between the occupant and the impact-absorbing cushion element in the event of an impending or imminent accident. On account of the short distance between the occupant and the cushion element, the occupant cannot reach any high speeds relative to the cushion element. Furthermore, the occupant can be cushioned by the cushion element, which is adjacent or at least situated in the direct vicinity, from the start of the accident onward.

The activation of the actuating device by a vehicle-mounted drive does not prevent the actuating device from also being moved in the direction of an occupant position by the action of a crash, in the same manner as the prior art.

The cushion element can be arranged in or on a door or in or on a body pillar of the vehicle, so that the pelvis and chest of a vehicle occupant can be protected to an optimum degree.

A plurality of cushion elements and/or additional foam elements which are arranged in series are advantageously provided, and can have an energy absorbing foam and/or honeycomb structure. The individual cushion elements and/or foam elements can also have a varied design, making possible a progressive absorption of impact energy.

The cushion elements and/or foam elements can be arranged such that they can be displaced with respect to one another and/or can be at least indirectly guided by linear guides. This arrangement helps to make the cushion element or elements moveable along a defined movement path in the direction of an occupant position.

In a particularly advantageous embodiment of the invention, the cushion element can be locked in a deployed position, so that the impact energy can be dissipated in the deployed state of the cushion element.

The vehicle-mounted drive is advantageously embodied as an electric motor. This type of drive is comparatively cost-effective and can be powered by the electrical system of the vehicle at relatively low cost. The electric motor can drive the actuating device, which in turn moves the cushion element from a rest position into a deployed position in the direction of the occupant position.

The actuating device can have a traction means which is embodied as a cable or belt and is advantageously stored, at least in sections, in or on a store. The traction means can be wound in the store, which can be driven by the vehicle-mounted drive. This permits an actuating device for moving the cushion element to be formed with a particularly compact and simple mechanism.

According to another embodiment, an auxiliary drive is provided for moving the cushion element in the direction of the occupant position. Said auxiliary drive can be formed by a spring store and/or by pyrotechnic elements. Said elements can be used to bring about a further increase in movement speed relative to the actuation of the cushion element or elements activated by means of the vehicle-mounted drive.

It is particularly advantageous if the vehicle-mounted drive and/or the auxiliary drive are coupled to sensors for detecting the vehicle state and/or the state of the vehicle's surroundings. This makes it possible to control the vehicle-mounted drive for the actuating device in order to move the cushion element in the direction of the occupant position as early as before an impact against another party to an accident. Sensors for detecting the vehicle state can include wheel speed sensors or acceleration sensors, which are also used for controlling other safety systems such as ABS, ESP or airbags. The surroundings of the vehicle can, for example, be monitored by means of cameras or other sensors which detect the surroundings (for example radar or infra-red sensors), so that another party to an accident which is approaching the vehicle obstruction can be detected.

Preferably, at least one return element is provided for moving the at least one cushion element from a deployed position into the rest position, so that the system is reversible, and can be re-used. This is, for example, not possible in airbag systems, since they must be replaced after they have been triggered. In contrast, the cushion elements of the safety device according to the invention can be returned to the rest position after having been preventatively deployed, if no accident has occurred.

The return element advantageously comprises a tension spring, and the actuating device can move the cushion element from a rest position into a deployed position counter to the action of the spring. The cushion element can then be returned to its rest position by the action of the tension spring, alternatively it may be reset by the actuating device which is driven by the vehicle-mounted drive.

Other objects, advantages and novel features of the present invention will become apparent from the following detailed description of the invention when considered in conjunction with the accompanying drawings.

DETAILED DESCRIPTION OF THE DRAWINGS

Figure 1:
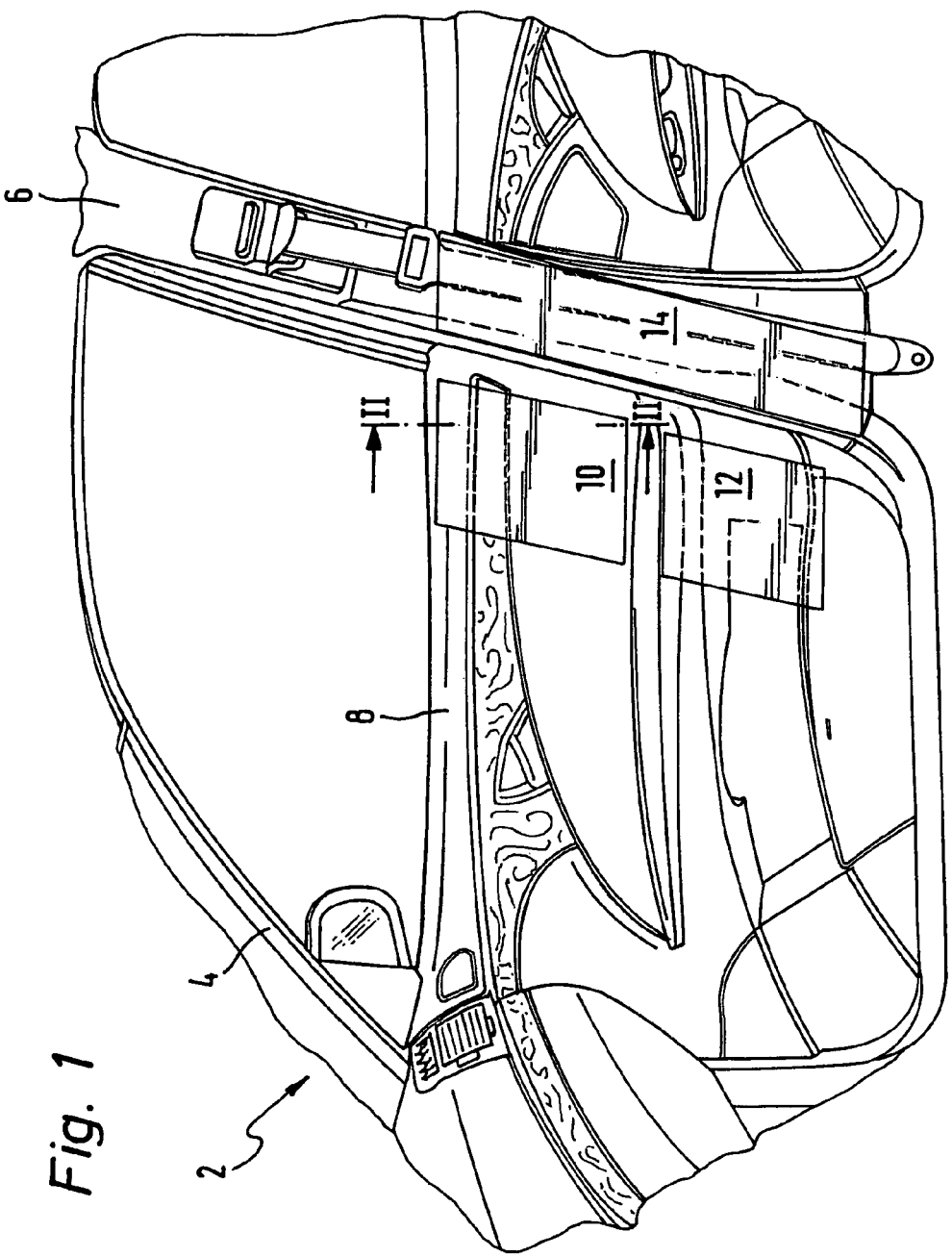
FIG. 1 is a perspective side view of a section of a passenger compartment having a safety device according to the invention.

FIG. 1 illustrates a section of a passenger compartment of a vehicle 2, which includes an A pillar 4 and a B pillar 6, with a door 8 arranged between the pillars. Safety devices 10 and 12 are arranged on the door 8 in the region adjacent to the B pillar 6. In addition, a further safety device 14 is provided in the B pillar 6, adjacent to the safety devices 10 and 12.

Figure 2:
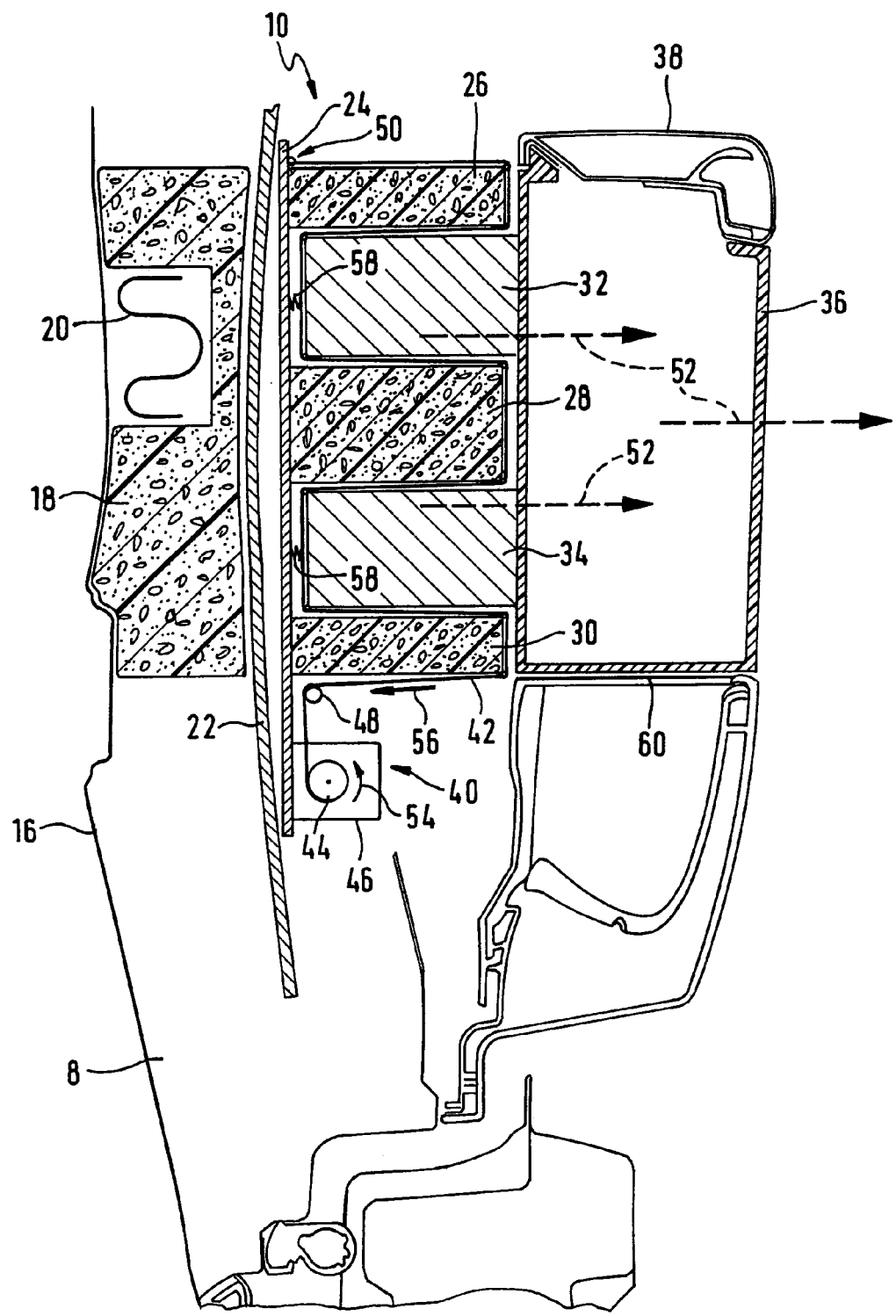
FIG. 2 shows a cross-section through a safety device according to the invention, along section line II-II in FIG. 1.

The safety device 10 is illustrated in cross section and in detail in FIG. 2. The door 8 has a door outer skin 16 which outwardly delimits the passenger compartment of the vehicle 2. A foam element 18, which is stabilized by means of a schematically illustrated core 20, is provided adjacent to the door outer skin 16. The foam element serves to absorb impact energy in the event of a lateral impact against the door outer skin 16.

An intermediate wall 22, which serves to reinforce the structure of the door 8, is provided adjacent to the foam element 18, and bearing plate 24 is arranged adjacent to the intermediate wall 22. Arranged on the bearing plate 24 are a total of three foam elements, including an upper foam element 26, a central foam element 28 and a lower foam element 30. The foam elements 26 to 30 are of oblong form and extend in the direction of the interior space of the passenger compartment of the vehicle 2. An upper cushion element 32 is displaceably mounted between the upper foam element 26 and the central foam element 28, and correspondingly a lower cushion element 34 is displaceably mounted between the central foam element 28 and the lower foam element 30. The cushion elements 32 and 34 are connected to a stowage compartment 36 whose interior space can be accessed by pivoting open an armrest 38.

The cushion elements 32 and 34 can be moved relative to the foam elements 26 to 30 by an actuating device which is denoted as a whole by the reference designation 40. The actuating device 40 comprises a tension belt 42, which is partially wound on a store 44. The actuating device 40 also comprises a drive 46 which drives the store 44, so that the tension belt 42 can be wound on to or unwound from the store 44. After exiting the store 44, the tension belt 42 is guided over a deflecting roller 48 and is initially wrapped around the lower foam element 30. The tension belt 42 then subsequently runs around the lower cushion element 34 and, as it runs on, around the central foam element 28, around the upper cushion element 32 and finally around the upper foam element 26. The tension belt 42 is secured at a fastening point 50 on the bearing plate 24.

In order to permit a deploying movement, indicated by dashed arrows 52, of the cushion elements 32 and 34 and of the stowage compartment 36, the store 44 can be driven in the drive direction denoted by the arrow 54, by the drive 46. This causes the tension belt to be moved in the direction denoted by 56 and to be wound onto the store 44. As the tension belt 42 is wound, the section of the tension band between the store 44 and the fastening point 50 is shortened, so that the cushion elements 32 and 34 together with the stowage compartment 36 perform a deploying movement indicated by the arrows 52. It is possible to form the store 44 as an automatic roll-up device which makes it possible to lock the tension belt 42 in a certain position. If such locking is carried out in a deployed position of the cushion elements 32 and 34, the cushion elements 32 and 34 can be locked in the deployed position.

The cushion elements 32 and 34 and the stowage compartment 36 can be moved back from a deployed position into a rest position, illustrated in FIG. 2, by means of two tension springs 58 which are arranged on the bearing plate 24 and are connected to the cushion elements 32 and 34. Here, the stowage compartment 36 is guided by means of a linear guide 60.

With the presented safety device, it is possible for the cushion elements 32 and 34 and the stowage compartment 36 to be moved from the rest position illustrated in FIG. 2 into a deployed position even before an impact of another party to an accident against the door skin 16, so that the distance between a vehicle occupant and the stowage compartment 36 can be reduced to a minimum as early as before the start of the accident. This makes optimum occupant protection possible.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A safety for reducing the risk of injury to an occupant of a vehicle in the event of lateral impact, comprising:
    at least one cushion element which is arranged on the vehicle laterally adjacent to an occupant position and can be moved by an actuating device having a traction device comprised of a cable or a belt from a rest position into a deployed position in the direction of the occupant position, wherein the traction device is storable on a store, and
    a vehicle-mounted drive for driving the actuating device, wherein
    the vehicle-mounted comprises an electric motor that drives the store.

2. The safety device as claimed in claim 1, wherein:
    the cushion element is arranged in or on a door or in or on a body pillar of the vehicle.

3. The safety device as claimed in claim 1, wherein:
    a plurality of the at least one of the cushion elements and additional foam elements are arranged in series.

4. The safety device as claimed in claim 3, wherein:
    the at least one of the cushion elements and additional foam elements are arranged such that they can be displaced with respect to one another.

5. The safety device as claimed in claim 3, wherein:
    the at least one of cushion elements and the additional foam elements are at least indirectly guided by a linear guide.

6. The safety device as claimed in claim 1, wherein:
    the cushion element can be locked in a deployed position.

7. The safety device as claimed in claim 1, wherein:
    the traction device is stored, at least in sections, in or on a store.

8. The safety device as claimed in claim 7, wherein:
    the traction device can be wound in or onto the store.

9. The safety device as claimed in claim 1, wherein:
    at least one return element is provided for moving the at least one cushion element from the deployed position into the rest position.

10. The safety device as claimed in claim 9, wherein:

the return element comprises at least one tension spring.

11. Method for operating a safety device for a motor vehicle for reducing the risk of injury to a vehicle occupant in the event of an imminent impact involving an accident, said device comprising:

at least one cushion element which is arranged on the vehicle laterally adjacent to an occupant position; and an actuating device having a traction device comprised of a cable or belt for moving said cushion element from a rest position into a deployed position in a direction of the occupant position;

the method comprising driving the actuating device an electric motor, and driving a store with the electric motor for winding the cable or belt in or onto the store.

* * * * *